Dec. 1, 1925.

W. L. TAYLOR

SAW SET

Filed Dec. 1, 1924

1,563,539

William L. Taylor
INVENTOR

BY Victor J. Evans
ATTORNEY

Patented Dec. 1, 1925.

1,563,539

UNITED STATES PATENT OFFICE.

WILLIAM L. TAYLOR, OF BLACK OAK, ARKANSAS.

SAW SET.

Application filed December 1, 1924. Serial No. 753,268.

*To all whom it may concern:*

Be it known that I, WILLIAM L. TAYLOR, a citizen of the United States, residing at Black Oak, in the county of Craighead and State of Arkansas, have invented new and useful Improvements in Saw Sets, of which the following is a specification.

This invention relates to saw sets and its principal object is to provide a saw set which will set the saw teeth true and uniform.

A further object of the invention is to provide a saw set which will hold the saw in proper position until the blow has been struck to set the tooth at the required pitch.

A still further object of the invention is to provide a saw set which embodies a rigid base and a resiliently mounted anvil or tooth setting member adapted to be engaged by a hammer or the like.

With the preceding and other objects and advantages in mind, the invention consists in the novel combination of elements, construction and arrangement of parts and operation to be hereinafter specifically referred to, claimed and illustrated in the accompanying drawings, wherein:

Figure 1:
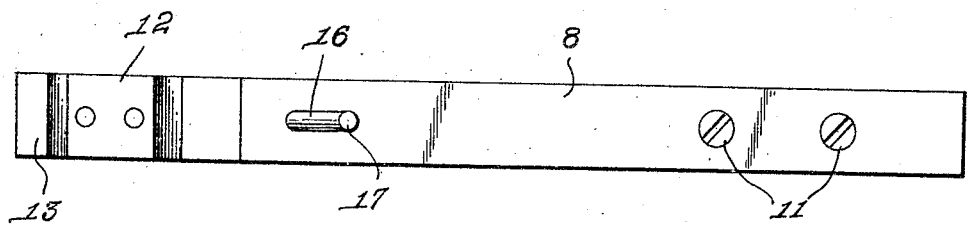
Figure 1 is a top plan view of a saw set constructed in accordance with my invention.
Figure 2:
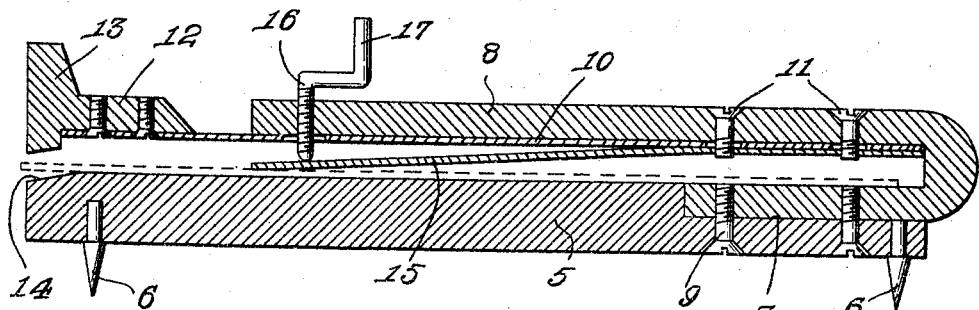
Figure 2 is a longitudinal sectional view of the same.
Figure 3:
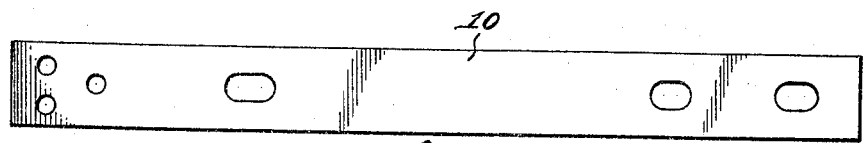
Figure 3 is an elevation of one of the parts of the invention.

Referring to the drawing in detail wherein corresponding characters of reference denote corresponding parts throughout the several views, the numeral 5 designates a longitudinal bar or body from the underface of which barbs or anchoring elements 6 extend which are adapted to be driven into a base. As shown in Figure 2, the upper face of the body 5 at its rear end is cut away as at 7 to receive one leg of a horizontally arranged U-shaped member 8, the latter being arranged in parallelism with the body 5 and disposed above the same. Fastenings 9 extend through this body 7 and secure this leg of the U-shaped member in position. Extending longitudinally from the underface of the other leg of the U-shaped member 8 is a flat leaf spring 10 whose ends are secured to the U-shaped member by fastenings 11. The forward end of this leaf spring 10 extends beyond the U-shaped member and extends approximately to the forward end of the body 5, and is secured to the underface of a shank 12 of a saw setting head 13. The underface of the saw setting head 13 is cut on a line which is parallel to a saw setting surface 14 formed upon the upper face of the body 5.

In order to firmly hold the saw blade in position for setting the teeth, an angularly disposed leaf spring 15 is interposed between the body 5 and the upper leg of the U-shaped member 8. This spring 15 extends at an oblique angle with respect to the horizontal so that its forward end touches the saw indicated in dot and dash lines in Figure 2 while its opposite end extends parallel to the spring 10 and is secured to the U-shaped member by means of the fastening element 11 above set forth. In order to press the retaining spring 15 against the saw, a screw 16 is threaded through the upper leg of the U-shaped member 8 and is moved into and out of engagement with the saw blade by means of a crank handle 17 formed on this screw. In the use of the device, the saw is arranged in position as shown in dot and dash lines and the element 13 struck a blow with a hammer to set the tooth to the required pitch. After the blow is struck, the member 13 immediately returns to horizontal position for a second operation, and consequently the saw blade can be set step by step and its teeth successively set.

Figure 4:
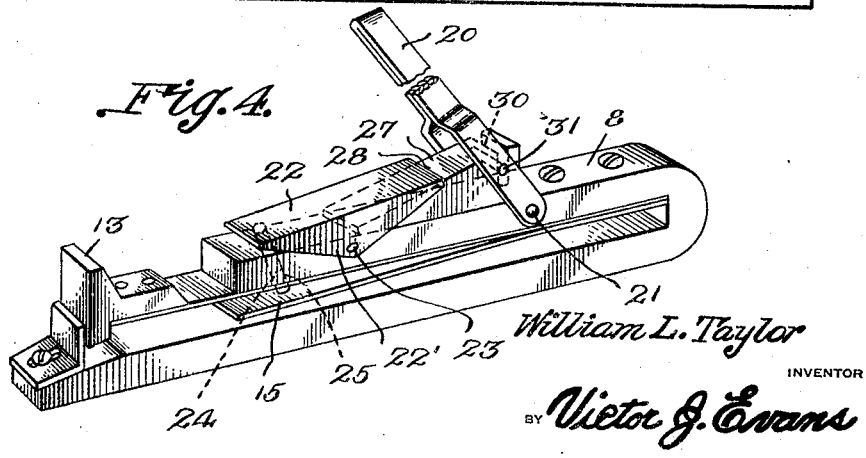
Figure 4 is a modified embodiment of the invention.

In Figure 4, I have shown a modified embodiment of the invention, and in this instance, the resilient member 15 is actuated through the medium of a lever 20 which is pivoted to the upper leg of the U-shaped member 8 as indicated at 21. A plate 22 is arranged above this upper leg of the U-shaped member 8 and is provided with flanges 22 which are substantially triangular shaped and are pivoted as at 23. A vertically movable pin 24 is arranged in an angularly disposed bore 25, and the upper end of the U-shaped member 8 and is adapted to be moved against the spring 15 to hold the same in engagement with the saw. In order to rock this plate 22 to cause the same to engage the pin, a slidable block 27 is arranged upon the upper face of the upper leg of the U-shaped member 8 and has an inclined upper face 28 which rides beneath the inner end of the plate 22. This block 27 is provided with a notch extending transversely and indicated at 30 with which a pin 31 is engaged, the latter being engaged with the lever 20 as shown.

From the disclosure it will be apparent that upon moving the lever 20 in a forward direction, the block will be moved forwardly and engage the plate 22 to cause the same to rock on its pivot and thereby force the pin downwardly into engagement with the spring member 15 and thereby hold the latter into frictional engagement with the saw arranged between the body 5 and the upper leg of the U-shaped member 8.

While I have shown and described the preferred embodiment of the invention, it will be understood that changes in the construction, combination and arrangement of parts may be made, without departing from the spirit of the invention or the scope of the subjoined claims.

What is claimed:

1. A saw set comprising a base having an anvil surface at one end, a saw setting element arranged above the base and adapted to be engaged by an implement, a resilient arm arranged above the base, a lever pivoted above the base, a vertically movable element adapted to engage the resilient element to hold the same into contact with the saw, a plate pivotally mounted above the base and manually operable longitudinally movable inclined block adapted to engage the plate and move the same into engagement with the pin to move the same downwardly against the resilient arm.

2. A saw set comprising a base, a rigid arm supported on the base in spaced relation thereto, a resilient arm connected to the rigid arm, a saw setting element carried by the free end of the resilient arm and adapted to be struck a blow by a hammer, the saw being adapted to be arranged upon the base below the saw setting element, a resilient saw holding element carried by the rigid arm, a vertically movable pin carried by the arm and adapted to move downwardly to engage the resilient element and hold the same in contacting relation with the saw and thereby hold the latter in position upon the base, a pivoted block carried by the rigid arm and having its ends inclined in opposite directions and one of which being engageable with the pin, and a longitudinally manually operable shiftable actuating block on the rigid arm and engageable with the opposite end of the pivoted block to rock the latter.

In testimony whereof I affix my signature.

WILLIAM L. TAYLOR.